June 25, 1968  G. PETERSON  3,390,310
MAGNET CHARGER

Filed March 24, 1965  2 Sheets-Sheet 1

INVENTOR
Glen Peterson
BY
Mildred K. Flowers
AGENT

June 25, 1968  G. PETERSON  3,390,310
MAGNET CHARGER
Filed March 24, 1965  2 Sheets-Sheet 2
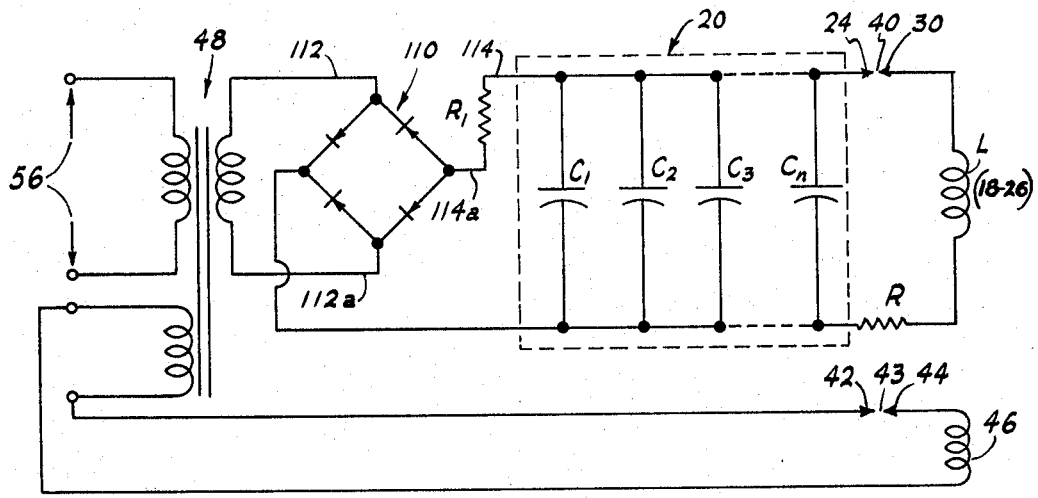
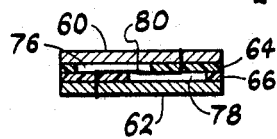
Fig. 4
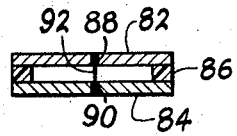
Fig. 6
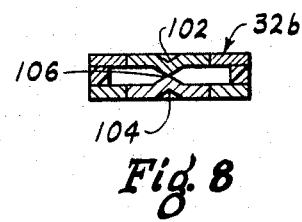
Fig. 8
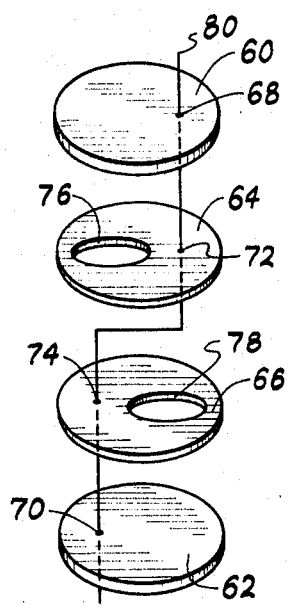
Fig. 5
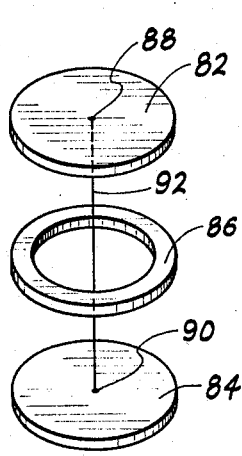
Fig. 7
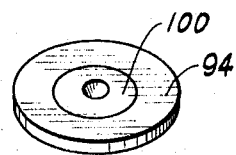
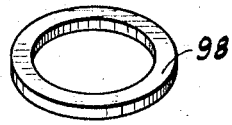
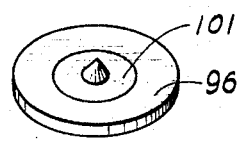
Fig. 9
INVENTOR.
Glen Peterson
BY Mildred K. Flowers
AGENT United States Patent Office 3,390,310
Patented June 25, 1968

3,390,310
MAGNET CHARGER
Glen Peterson, 540 S. 83rd East Ave.,
Tulsa, Okla. 74112
Filed Mar. 24, 1965, Ser. No. 442,324
9 Claims. (Cl. 317—157.5)

ABSTRACT OF THE DISCLOSURE

A magnet charger operated by a coin-like member or control slug in a manner similar to the operation of a vending machine. The magnet charger is particularly designed for precluding the use of a counterfeit control slug for operation thereof, and if any attempt is made to operate the magnet charger with any operating member other than the regularly provided coin-like slug, the charger will function to demagnetize a magnet rather than magnetize the magnet.

This invention relates to improvements in methods and means for charging magnets and more particularly, but not by way of limitation, to a magnet charger of a compact size designed for simplicity of operation and economy of construction.

There are many types of magnet charging devices available today, but most of these devices have certain disadvantages in that they are usually extremely expensive and difficult to operate. For example, the magnetic chargers in use today range from large permanent magnets to electronically controlled devices which may cost many thousands of dollars to construct. In addition, the operation of many of these machines usually requires the use of particularly trained or skilled personnel, thus increasing the cost of operation of the machines. Magnets are becoming more widespread in use today and are becoming particularly popular for use in combination with relatively inexpensive devices such as toys, game devices, and the like. As a result, it will be apparent that the recharging of magnets in a simple and economic manner is becoming of increasing importance.

The present invention contemplates a novel magnet charger apparatus or machine of a compact size being particularly designed for economy of construction and ease of operation while being capable of charging very large magnets as well as those having exceptionally high coercive forces. The novel magnetic charger may be operated by a coin-like member or control slug in much the same manner as a vending machine. Thus, the operation is so simple that it may be readily accomplished by a novice. In addition, the magnet charger is of a size to permit installation thereof on a wall or otherwise disposed in a public place for ease of utilization. The novel magnet charger is provided with means for substantially precluding use of a counterfeit control slug member or operating coin other than the particular device designed for operation of the machine. This is of particular importance when considering use of the device in a public place. When any attempt is made to operate the magnet charger with any operating member other than the regularly provided coin-like slug, the charger will function to demagnetize a magnet rather than magnetize the magnet.

It is an important object of this invention to provide a novel magnet charger of a simple and economic construction which may be utilized for charging very large magnets as well as magnets having high coercive forces.

It is another object of this invention to provide a novel magnet charger which is particularly designed and constructed of a compact size for facilitating installation and use thereof.

A further object of this invention is to provide a magnet charger which may be installed in a public place for operation by a coin-like member in much the same manner as a vending machine.

Another object of this invention is to provide a magnet charger whereby operation thereof by counterfeit means is substantially precluded.

Still another object of this invention is to provide a magnet charger which may be operated in a simple manner whereby a novice may use the device for charging of a magnet.

Other and further objects and advantageous features of the present invention will hereinafter more fully appear in connection with a detailed description of the drawings in which:

FIGURE 3 is a schematic circuit diagram of the charging system of the invention.

FIGURE 4 is a sectional elevational view of a control slug which may be used with the magnet charger of the invention.

FIGURE 5 is an exploded perspective view of the control slug depicted in FIGURE 4.

FIGURE 6 is a view similar to FIGURE 4 showing a modified form of control slug.

FIGURE 7 is an exploded perspective view of the slug shown in FIGURE 6.

FIGURE 8 is a sectional elevational view of still another modification of control slug.

FIGURE 9 is an exploded view of the control slug depicted in FIGURE 8.

Figure 1:
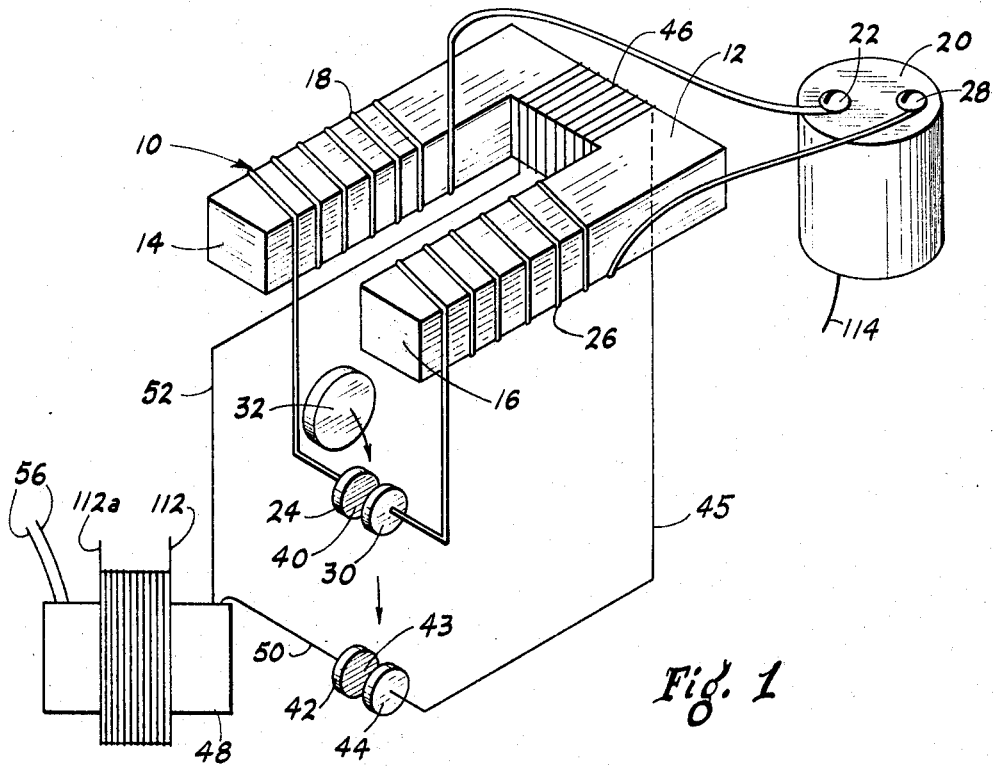
FIGURE 1 is a perspective view of a magnet charger embodying the invention.

Referring to the drawings in detail and particularly FIGURE 1, reference character 10 generally indicates a charger apparatus comprising a substantially U-shaped body member or yoke 12 with the spaced legs 14 and 16 thereof providing magnetic poles as will be hereinafter set forth. The yoke 12 and poles 14 and 16 are preferably formed from a single continuous body of soft magnetic steel. A charging coil 18 is suitably wound or disposed around the leg or pole 14 and has one end suitably secured or electrically connected to a charged capacitor 20 by means of a suitable terminal 22. The opposite end of the coil 18 is suitably connected with a first contact member 24. A second charging coil 26 is similarly wound or disposed around the leg or pole 16 and has one end thereof electrically connected with the capacitor 20 by a suitable terminal 28. The opposite end of the coil 26 is suitably connected with a second contact 30 which is spaced from the first contact 24.

Figure 2:
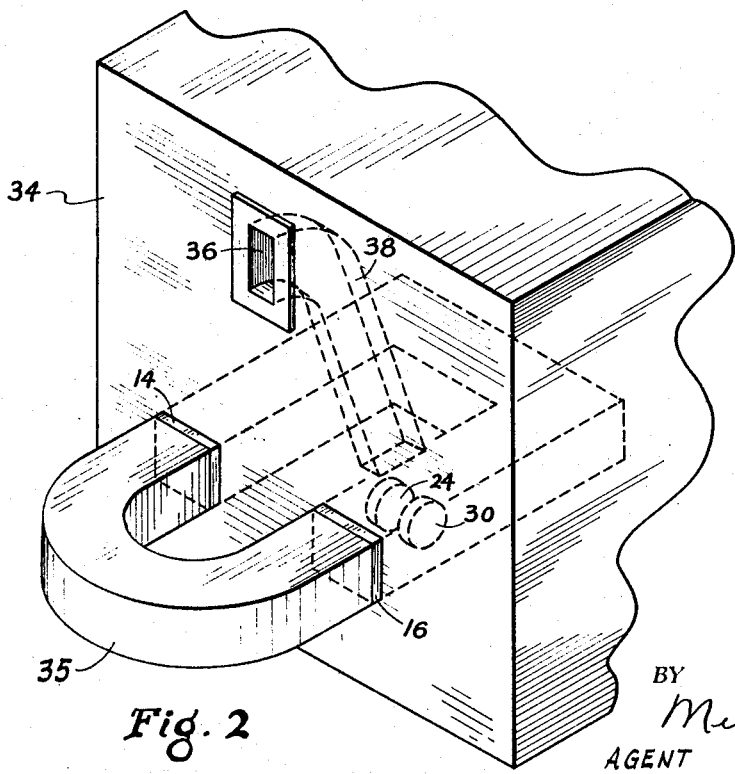
FIGURE 2 is a perspective view of a magnet charger embodying the invention depicting a magnet being charged thereby.

A conductive slug 32 of a configuration generally similar to coin, or the like, is provided for initiating operation of the charger apparatus 10 and is adapted for disposition between the spaced contacts 24 and 30 for closing the electric circuit comprised of the coils 18 and 26 and the capacitor 20 for a purpose and in a manner as will be hereinafter set forth. For purposes of convenience in certain installations, it may be preferable to dispose the charger assembly or apparatus 10 with a housing 34 (FIGURE 2) in a manner whereby only the outer extremities of the poles 14 and 16 are exposed. The magnet to be charged, such as shown at 35, may be readily manually placed or brought into simultaneous engagement with the exposed poles 14 and 16. Whereas the magnet 35 depicted herein is of the horse shoe type, it is to be understood that a magnet of substantially any desired configuration may be placed in engagement with the exposed poles 14 and 16. In addition, a suitable coin or slug receiving slot 36 may be provided in the housing in communication with a coin chute 38 extending between the slot 36 and a point spaced slightly above the hiatus 40 between the contacts 24 and 30. Thus, the slug 32 may be inserted into the slot 36 and will drop by gravity through the chute 38 and into hiatus 40. As the slug 32 moves between the contacts 24 and 30, the opposite sides or faces thereof will simultaneously wipe the inwardly directed surfaces of the contacts 24 and 30 for momentarily closing the electrical circuit comprised of the coils 18 and 26 and capacitor 20 thereby discharging the capacitor 20 through the coils 18 and 26 for providing a considerable flux of magnetism through the magnetic circuit composed of the poles 14 and 16, the body or yoke 12 and the magnet 35 being charged which is placed against or across the faces of the poles 14 and 16 as hereinbefore set forth.

The contact slug 32 is of a particular construction, as will be hereinafter set forth, for operation in combination with the contacts 24 and 30 to provide an instantaneous contact path having a very small fraction of an ohm of resistance thereby carrying thousands of amperes for a small fraction of a second of time and then burning clean. The slug 32 literally explodes under the impact of the intense current, and consequently each slug is usable for only a single operation of the charger 10.

The slug 32 performs two essential duties with regard to the magnetic charging apparatus or machine 10: (1) the slug controls the time length of the charging period, which is an extremely important function as will be hereinafter set forth; and (2) the slug controls the economics of the operation of the charging apparatus 10. By controlling the economics of the machine operation, I mean the owner of the charging apparatus 10 may maintain a supply of the slugs 32 which he may sell to a person desiring to use the apparatus 10 for charging a magnet. Each slug is serviceable for only a single charging operation and then burns out. In addition, the fact that the slug burns out is important in precluding use of a counterfeit slug or coin for operation of the machine.

In order to preclude operation of the apparatus 10 by any coin, or the like, other than one of the particularly designed slugs 32, a second pair of spaced contacts 42 and 44 are disposed below the contacts 24 and 30 and are preferably in substantial alignment therewith whereby the hiatus 43 between the contacts 42 and 44 is in substantial alignment with the hiatus 40 between the contacts 24 and 30. The contact 44 is electrically connected by means of an electrical conduit 45 with a suitable winding or coil 46 disposed around the yoke 12. The contact 42 is electrically connected with a suitable transformer 48 by an electrical conduit or lead 50. The transformer, in turn, is connected with the winding or coil 46 by an electrical lead 52. Of course, electrical current may be supplied to the transformer 48 in any suitable manner through the leads 56 as is well known.

When the slug 32 has passed through the hiatus 40, it will continue to drop by gravity into the hiatus 43 between the contacts 42 and 44. As the slug 32 engages the inwardly directed faces of the contacts 42 and 44, the electrical circuit is not closed or completed since the slug 32 has burned out. Thus, the slug 32 passes on through the apparatus 10 with no further actuation thereof. If a counterfeit coin or slug (not shown) is inserted through the coin slot 36 in lieu of one of the slugs 32, the counterfeit coin will engage the first contacts 24 and 30, closing the electrical circuit comprising the coils 18 and 26 and capacitor 20 whereby the magnet 35 may be charged as hereinbefore set forth. However, the counterfeit slug will then drop into the hiatus 43 and engage the second contacts 42 and 44. This will close the secondary circuit comprised of the winding or coil 46 and transformer 48. This will put a husky alternating current through the secondary circuit of such magnitude as to completely discharge the magnet 35 which has just been charged, or at least will knock it far enough down on the curve as to require recharging.

Referring now to FIGURES 4 and 5, the slug 32 depicted therein comprises a pair of substantially identical disc shaped metallic contact plates 60 and 62 having a pair of insulating discs or members 64 and 66 interposed therebetween. The metallic plates 60 and 62 are provided with relatively small off-set or off-center apertures 68 and 70, respectively, and the discs or plates 60 and 62 are so orientated with respect to each other that the apertures 68 and 70 are disposed in substantially diametrically opposed positions. The insulating members 64 and 66 are provided with similar small apertures 72 and 74, respectively, with the aperture 72 being disposed in substantial alignment with the aperture 68 and the aperture 74 being disposed in substantial alignment with the aperture 70. In addition, the insulating members 64 and 66 are provided with relatively large apertures 76 and 78, respectively, which are preferably of a substantially oval configuration. The apertures 76 and 78 are off-set or off-center as clearly shown in FIGURES 4 and 5 and the insulating members 64 and 66 are so arranged or orientated with respect to each other that the apertures 76 and 78 are substantially diametrically opposed. It will be apparent, however, that the apertures 76 and 78 are sufficiently large or are of a size whereby the inwardly disposed portions thereof lie in an over-lapping relationship. A fuse wire 80 extends through the slug 32 and is of a substantially Z-shaped configuration as clearly shown in FIGURE 5 whereby the wire 80 extends through the aligned apertures 68 and 72, across and between the abutting faces or surfaces of the insulating members 64 and 66, and through the aligned apertures 74 and 70.

The fuse wire 80 may be constructed from any suitable material and extends beyond the opposite sides of the slug 32 or beyond the exposed or outer faces of the discs 60 and 62. Both surfaces of each insulating member 64 and 66 as well as the inwardly directed surfaces of the discs 60 and 62 may be coated with a suitable adhesive and the four members 60, 64 and 66 and 62 are pressed or cemented together to form a solid or unitary type assembly. Following this assembly or cementing operation, the protruding ends of the fuse wire 80 may be soldered, welded, or otherwise united to the metallic contact plates 60 and 62 at the point where the wire 80 protrudes from the apertures 68 and 70.

FIGURES 6 and 7 disclose a control slug 32a which is of a somewhat simpler construction than the control slug 32 and which may also be utilized for operation of the magnet charger 10. The control slug 32a comprises a pair of metallic contact discs or plates 82 and 84 having an annular insulating ring 86 interposed therebetween. The plates 82 and 84 are provided with substantially centrally disposed relatively small apertures 88 and 90, respectively. A fuse wire 92 extends through the apertures 88 and 90 and protrudes beyond the plates 82 and 84. In order to assemble the slug 32a, it is preferable that the contact discs 82 and 84 and insulating ring 86 disposed therebetween be united or fastened together by means of suitable adhesives in any well known manner. The fuse wire 92 may then be inserted through the substantially aligned apertures 88 and 90 with the protruding ends thereof then be soldered, spot welded, or otherwise united to the contact plates 82 and 84. One advantage of the slug 32a over the slug 32 is that the fuse wire 92 may be of a shorter overall length than the fuse wire 80.

FIGURES 8 and 9 disclose still another contact slug 32b. The slug 32b comprises a pair of substantially identical contact plates 94 and 96 having an annular insulating ring 98 interposed therebetween. The contact discs or plates 94 and 96 are preferably constructed from a fairly high resistivity metal such as stainless steel with the central portions 100 and 101 thereof, respectively, being relatively thin and constructed of a relatively low resistivity metal such as silver, copper or aluminum. The insulating ring 98 is substantially identical to the ring 86 hereinbefore set forth. In order to assemble the slug 32b, it is preferable to cement the discs 94 and 96 with the insulating ring 98 interposed therebetween to provide a single assembly. Subsequent to the uniting of the members 94, 96 and 98, the slug 32b may be provided with inwardly directed dimples 102 and 104 on the oppositely disposed outer surfaces of the discs 94 and 96. This may be done in any suitable or well known manner such as by an automatic dimpling machine or the like. The dimples 102 and 104 are so formed as to produce a pointed contact between the discs 94 and 96 at 106 as clearly shown in FIGURE 8.

All of the slugs 32, 32a and 32b function in a similar manner when passed between the contacts 24 and 30 to provide instantaneous contact paths having a very small fraction of an ohm of resistance as hereinbefore set forth and thereby carry thousands of amperes for a small fraction of a second of time and then burn clean. Thus, when any of the slugs 32, 32a and 32b engage the second contacts 42 and 44, the electrical circuit comprised of the coil 46 and transformer 48 will not be closed.

Referring now to FIGURE 3, the electrical circuit of the charging system is depicted therein. The charging capacitor 20 may include substantially any desired number of condensers having substantially any desired value, such as shown at $C_1$, $C_2$, $C_3$ ... $C_n$ and the total charging capacitance may be determined as follows:

$$C = C_1 + C_2 + C_3 + \ldots C_n$$

The coil L in FIGURE 3 represents the inductance of the charging coils 18 and 26 and whereas the contacts 24 and 30 actually break or separate the coils 18 and 26, they are depicted off-set therefrom in FIGURE 3 for purposes of illustration. The resistor R shown in FIGURE 3 represents the resistance of the coils 18 and 26. A suitable rectifier bridge 110 is electrically connected to the transformer 48 by leads 112 and 112a and a suitable resistance $R_1$ may be interposed between the rectifier bridge 110 and capacitor 20 by suitable leads 114 and 114a.

In the present invention, it can be shown that the magnet charging current, at least to a close approximation, is given by the relation:

$$i = \frac{-Q_0(R^2 + K^2)}{2KL} E^{-\frac{Rt}{2L}} \sin \frac{Kt}{2L}$$

where:

$Q_0$ is the initial charge on the condenser
R is the total circuit resistance
L is the total circuit inductance $$K^2 = \frac{4L}{C} - R^2$$

C is the total capacity of the condenser

For maximum charging current, it is preferable to operate the apparatus 10 with the smallest possible circuit resistance. In addition, for practical considerations and considering the size of condensers which may be readily purchased and installed in a reasonable space or area, as well as the voltage to which the condensers may be charged, the maximum ampere turns for charging a magnet such as the magnet 35 is generally developed when the coils 18 and 26 are provided with several or a plurality of turns. Altogether, this usually results in $$\frac{4L}{C} \gg R^2$$

whereby the discharge is oscillatory.

The problem at this point is to stop the discharge after the first half cycle of the oscillatory discharge and prevent the return or swing back of current in an opposite direction, which would either discharge the magnet or charge it in the opposite direction. The usual expensive chargers available today generally use a ignitron to initiate and control the discharge. However, this problem is solved in the present invention by the use of the special fusing slugs 32 which set off the discharge and burn out before it can fly-back.

In an ideal situation, the slug 32 is so designed as to transport a charge of $Q_0$ in a half-period $T/2$ of the discharge cycle, where T is the full period of the discharge cycle. By way of example, if in the equation for "$i$" hereinbefore set forth, we use the value of $$K = 2\sqrt{\frac{L}{C}}$$

and since $$\frac{4L}{C} \gg R^2$$

we arrive at the following:

$$i = \frac{Q_0}{\sqrt{LC}} E^{-\frac{R}{2L}t} \sin \frac{t}{\sqrt{LC}}$$

$i$ will be maximum when $$\sin \frac{t}{\sqrt{LC}} = \pi/2$$

hence:

$$i_{max} = \frac{-Q_0}{\sqrt{LC}} E^{-\frac{\pi R}{4}\sqrt{\frac{C}{L}}}$$

Expanding the exponential, the following will result:

$$i_{max} = \frac{-Q_0}{\sqrt{LC}} \left(1 + \frac{\pi R}{4}\sqrt{\frac{C}{L}} - \frac{\pi^2 R^2}{32}\frac{C}{L} - \ldots\right)$$

Since $$\sqrt{\frac{L}{C}} \gg R \quad \frac{R}{\sqrt{\frac{L}{C}}} \ll 1$$

so that only the first term is significant, whereupon $$i_{max} = \frac{-Q_0}{\sqrt{LC}} = \frac{-E_0 C}{\sqrt{LC}} = -E_0 \sqrt{\frac{C}{L}}$$

As hereinbefore set forth, an important function of the slug 32 is to control the time length of the charging period. This is of particular importance since a certain amount of time is required to provide a magnet, such as the magnet 35, with a good charge because of the skin effect phenomena. In other words, the larger the magnet, and the higher its conductivity, the longer the length of time or period of the pulse should be to provide an efficient charging operation. Therefore, the $\sqrt{LC}$ has an ideal value for each kind, type, and shape of magnet. From a practical viewpoint, it appears that the period of the pulse should be as long as possible, consistent with providing a sufficiently large value of $i_{max}$ as hereinbefore set forth in the equation therefor. For example, if a bank of 4,000 mf. is provided and is charged to 500 volts, the following result will apply:

$$(i_{max}) = .500\sqrt{\frac{4 \times 10^{-3}}{L}} = 500 \times .0632\sqrt{\frac{1}{L}}$$

$$= 31.4 \sqrt{\frac{1}{L}}$$

On the other hand, the half-period time is as follows:

$$\frac{T}{2} = \frac{\sqrt{LC}}{2} = .0316\sqrt{L}$$

From the above relation, it is possible to derive the following table of interest for the timing of the fuse slug 32:

| T/2 (sec) | L (hen) |
|---|---|
| $10^{-6}$ | $10^{-9}$ |
| $10^{-5}$ | $10^{-7}$ |
| $10^{-4}$ | $10^{-5}$ |
| $10^{-3}$ | $10^{-3}$ |

Since $L \approx FN^2d$, mh., for solenoids, where $F \approx .04$ and $d =$ the diameter of the coil in inches, the substitution of these values in the equation for $i_{max}$ as hereinbefore set forth will result in the following:

$$(i_{max}) = 31.4\sqrt{\frac{10^6}{.04dN^2}} = \frac{31.410^3}{.2N}\sqrt{\frac{1}{d}}$$

$$= \frac{157 \times 10^3}{N}\sqrt{\frac{1}{d}}$$

or $$N(i_{max}) = \text{Amp. turns} = 1{,}570{,}000\sqrt{\frac{1}{d}}$$

This resultant equation for $N(i_{max})$ gives the relation for the ideal number of ampere turns which can be obtained from this illustrative arrangement. It is seen to be ample for magnetic circuits as long as 20 or 30 inches.

With regard to the secondary circuit which provides for protection against the use of counterfeit operating devices, a secondary winding of the transformer 48 which is utilized to charge the condenser system or capacitor 20 may be utilized as the source of the discharging voltage. Thus, there is no need to provide a separate transformer for the secondary circuit system. For example, if the transformer is provided with 4 turns/volt core with a mean turn length around the core of 4 inches and the same mean turn length on the charger yoke, and if there were 50 turns of A.W.G. 16 on the transformer and 250 turns on the charger yoke, the instantaneous current upon closing of the secondary circuit by engagement of the contacts 42 and 44 by a counterfeit slug would be 312 amps. and this multiplied by 250 would yield 78,000 ampere turns to discharge the magnet 35.

From the foregoing, it will be apparent that the present invention provides a novel magnet charger apparatus which is particularly designed for economy of construction and simplicity of operation. The charger may be operated by the insertion of a properly designed coin-like slug member for closing the first contacts in order that a magnet may be charged. In the event a counterfeit slug is utilized a secondary circuit is provided for discharging the magnet, thus substantially eliminating use of the machine by cheating. The magnet charging apparatus may be readily installed in a convenient and possible location and the owner of the device may maintain a supply of the particularly designed operating slugs which he may sell to persons desiring to charge a magnet. Thus, not only is the operation of the magnet charger machine simple but a control of the economics involved may be maintained through the use of the operating slug members.

Changes may be made in the combination and arrangement of parts as heretofore set forth in the specification and shown in the drawings, it being understood that any modification in the precise embodiment of the invention may be made within the scope of the following claims, without departing from the spirit of the invention.

What is claimed is:

1. An operator device for a magnet charger and comprising a coin-like body having a pair of oppositely disposed contact faces, an insulator member interposed between the contact members, and fuse means connected between the contact faces for burning out upon the passage of sufficient electrical current therethrough whereby the operator device may be utilized for a single magnet charging operation only.

2. A magnet charger comprising a substantially U-shaped yoke member having a pair of spaced poles integral therewith for receiving a magnet thereagainst to be charged, a first charging coil wound around one of said poles and electrically connected between a capacitor and a first contact member, a second charging coil wound around the other of said poles and electrically connected between the capacitor and a second contact member which is spaced from the first contact member, slug means adapted for simultaneously engaging the first and second contact members for closing a first electrical circuit whereby a flux of magnetism will be provided through the poles and magnet for charging of the magnet, a third charging coil wound around the yoke and electrically connected between a second pair of spaced contact members whereby an alternating current will be provided in a second electrical circuit upon closing of said second electrical circuit, said slug means adapted for simultaneously engaging the second pair of spaced contact members subsequent to engagement of the first and second spaced contact members, said slug having fuse means for burning out due to the current passing therethrough upon engagement with the first and second contact members whereby engagement with the second pair of contacts will not close the second circuit.

3. A magnet charger comprising a yoke having a pair of poles integral therewith for receiving a magnet thereagainst to be charged, a first electrical circuit for providing a flux of magnetism through the poles and magnet for charging of the magnet, a second electrical circuit for providing an alternating current to discharge the charged magnet, said first electrical circuit comprising a pair of spaced contact members, one of said contact members being electrically connected with a first charging coil and the other of said contact members being electrically connected to a capacitor, said second circuit comprising a second pair of spaced contact members, one of said second pair of contact members being electrically connected to a transformer, the other of said second pair of contacts being electrically connected to a second charging coil which is electrically connected to the transformer, and operating means for simultaneously engaging the first pair of spaced contacts for closing the first electrical circuit, and said operating means having fuse means for burning out due to the electrical current passing therethrough whereby engagement of the operating means with the second pair of spaced contacts will preclude closing of the second circuit.

4. In a magnet charger having a first electrical circuit for charging of a magnet and a second electrical circuit for demagnetizing the charged magnet, an operating member comprising a coin-like body having oppositely disposed contact faces, an insulating member interposed between the contact faces, and fuse means extended between the contact faces for closing the first electrical circuit and burning out as a result of the current passing therethrough whereby closing of the second circuit by the operating member is precluded.

5. A magnet charger comprising a first electrical circuit for charging of a magnet and a second electrical circuit for demagnetizing the charged magnet, said first electrical circuit being under the control of an operator and said second electrical circuit not being under the control of said operator, and operating means for selectively closing the first circuit for charging of the magnet and subsequently burning out whereby the second electrical circuit will not be closed, said second electrical circuit being responsive to any operating means which does not burn out whereby the second electrical circuits will be closed to demagnetize the charged magnet.

6. A fuse device comprising a coin-like body having a pair of oppositely disposed contact surfaces, an insulator member interposed between the contact members, and fuse means connected between the contact surfaces for burning out upon the passage of sufficient electrical current therethrough.

7. A magnet charger comprising a yoke and a pair of spaced poles for receiving a magnet thereagainst, an electrical circuit operably connected between the poles for providing a flux of magnetism through the poles and magnet upon closing of the electrical circuit, and control means for selectively closing the electric circuit, said control means comprising a slug member of a coin-like configuration having oppositely disposed contact surfaces, insulating means interposed between the contact surfaces, and fuse means connected between the contact surfaces.

8. A magnet charger comprising a first electrical circuit for charging of a magnet and a second electrical circuit for demagnetizing the charged magnet, and operating means for selectively closing the first circuit for charging of the magnet, said second electrical circuit being responsive to counterfeit operating means for closing thereof to demagnetize the charged magnet, and said operating means comprising a coin-like control slug having oppositely disposed contact faces, insulating means interposed between the contact faces, and fuse means connected between the contact faces for burning out upon the closing of the first circuit whereby the said operating means will not close the second circuit.

9. A magnet charger comprising a substantially U-shaped yoke member having a pair of spaced poles integral therewith for receiving a magnet thereagainst which is to be charged, a first charging coil wound around one of the poles and electrically connected between a capacitor and a first contact member, a second charging coil wound around the other of said poles and electrically connected between the capacitor and a second contact member, and slug means adapted for simultaneously engaging the first and second contact members for closing an electrical circuit whereby a flux of magnetism will be provided through the poles and magnet for charging of the magnet, and wherein said slug means is provided with fuse means for burning out due to the electrical current passing therethrough whereby said slug means may be utilized for only a single charging operation.

References Cited

UNITED STATES PATENTS

| | | | |
|---|---|---|---|
| 3,249,825 | 5/1966 | Cohen | 335—284 |
| 2,792,532 | 5/1957 | Becker | 317—123 |
| 2,786,790 | 3/1957 | Connoy | 317—123 |
| 2,247,745 | 7/1941 | Brader | 335—284 |

MILTON O. HIRSHFIELD, *Primary Examiner.*

J. A. SILVERMAN, *Assistant Examiner.*